Feb. 3, 1959     A. CHISHOLM     2,871,556

METHOD OF MAKING MESH FABRIC

Filed Feb. 28, 1955

INVENTOR.
ALPIN CHISHOLM
BY Roberts Cushman & Grover
ATT'YS

United States Patent Office 2,871,556
Patented Feb. 3, 1959

2,871,556

METHOD OF MAKING MESH FABRIC

Alpin Chisholm, Attleboro, Mass., assignor to Bugbee & Niles Company, North Attleboro, Mass., a corporation of Massachusetts Application February 28, 1955, Serial No. 490,896

2 Claims. (Cl. 29—513)

This invention pertains to flexible fabric, usually metallic, useful in the manufacture of handbags, millinery, etc. Heretofore it has been customary to make such fabric by assembling and interlocking rings of various shapes, or by uniting metallic plates by means of rings or short chains, but according to general prior practice the parts which make up the completed fabric have been formed as individual units, and the assembly of these units, often of very small dimensions, is a troublesome and expensive operation.

The present invention has for its principal object the provision of a method of making such flexible fabric much more expeditiously and more cheaply than has heretofore been possible. A further object is to provide a novel method of making flexible fabric, all of whose constituent parts are of sheet metal. A further object is to provide a method of making such a flexible fabric, comprising small plates united by connecting links, such that the plates as first formed, are integrally joined by connecting elements to form a single unit, while the connecting links are similarly integrally joined to form a unit, the two units being assembled and the individual plates being joined by the links before the plates and links are separated from one another. Other and further objects and advantages of the invention will be pointed out in the following more detailed description and by reference to the accompanying drawings, wherein Fig. 1 is a plan view of a piece of fabric made in accordance with the present invention;

Figure 1:
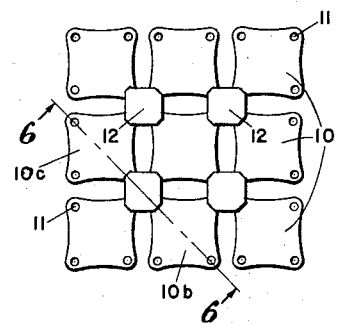

Referring to Fig. 1, the improved fabric made in accordance with the present invention comprises plates 10, usually of sheet metal, although it is contemplated that other sheet material may be employed, for example one of the synthetic plastics, these plates 10 as here illustrated being generally square in shape, although having rounded corners, and being provided with holes 11, one in each corner. These plates are flexibly united by the connecting links 12 hereinafter more fully described.

Figure 2:
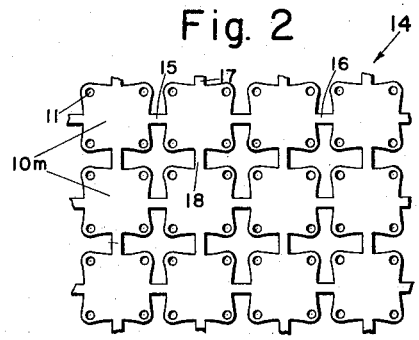
Fig. 2 is a fragmentary plan view showing a length of sheet material shaped to form the plate portions of the fabric but with said plate portions still integrally joined.

As a first step in the preparation of this fabric, the material chosen to form the plates 10 and which is in sheet form of the thickness of the desired plates and which as above suggested would usually be of metal, is subjected to a die press operation, whereby the embryo plates $10^m$ (Fig. 2) are cut to the desired peripheral contour, usually having the holes 11 formed at the same time, but in this preliminary die operation the plates are left connected by the narrow integral portions or bridges 15, 16, 17 and 18 extending from the mid-portion of each edge of the plate so that although the general contour of the desired plate is thus provided, the several plates are still connected to form an integral structure 14 which can be handled as a unit.

Figure 3:
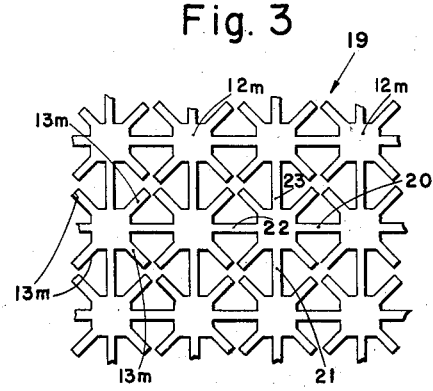
Fig. 3 is a view similar to Fig. 2, but showing a length of sheet material shaped to form the links which are employed for connecting the plates in the completed fabric, but with the links still integrally joined.
Figure 7:
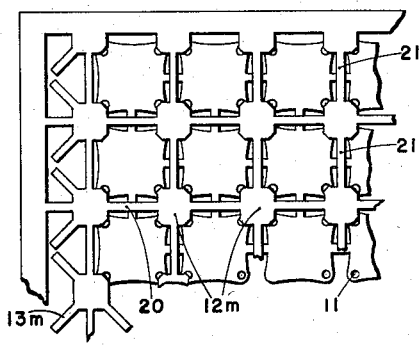
Fig. 7 is a plan view showing the units of Figs. 3 and 2 assembled as shown in Fig. 6.

The connecting links 12 are formed from sheet material, which would ordinarily be metal, the sheet material being subjected to a die operation which results in the formation of a unitary structure such as indicated at 19 (Fig. 3) comprising the embryo connecting links $12^m$, each having four diagonally extending narrow tabs $13^m$ and each also having the narrow connecting elements or bridges 20, 21, 22 and 23 extending from the midpoint of one of its sides and integrally joining it to the next adjacent link.

Figure 4:
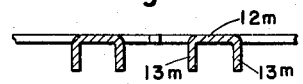
Fig. 4 is a fragmentary section, showing two of the connecting links at a later stage in the operation.
Figure 8:
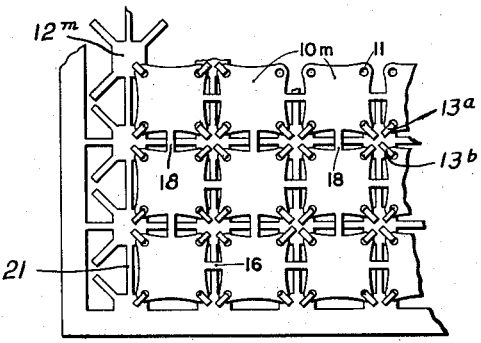
Fig. 8 is a view similar to Fig. 7, but showing the opposite or rear side of the assembly.
Figure 5:
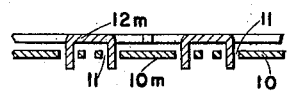
Fig. 5 is a view similar to Fig. 4, but showing the links of Fig. 4 assembled with two adjacent plates, but before the assembly operation has been completed.
Figure 6:
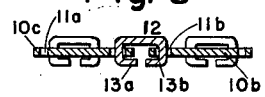
Fig. 6 is a fragmentary section on the line 6—6 of Fig. 1.
Figure 9:
Fig. 9 is a view generally similar to Fig. 6, but showing plates and links of somewhat different form.

After having prepared this unit 19, the connecting tabs $13^m$ are then turned downwardly as shown in Fig. 4, so that they are substantially perpendicular to the plane of the original sheet material. The unit 19, with its tabs downwardly projected, as shown in Fig. 4, is then assembled with the unit 14 so that the connecting tabs $13^m$ extend down through the holes 11 of the embryo plates $10^m$ of the unit 14, as shown in Figs. 5 and 8, the holes being sufficiently large so that the tabs pass loosely through them. The lower ends of these tabs $13^m$ are then bent inwardly as shown at $13^a$ and $13^b$ (Fig. 6), so that the units 14 and 19 are now permanently connected by these bent-over tabs. The elements 15, 16, 17 and 18 of the unit 14 and the elements 20, 21, 22 and 23 of the unit 19 are now readily removed in a single die operation, thus separating the embryo plates $10^m$ from each other, and at the same time separating the embryo connecting links $12^m$ from each other, leaving the completed fabric as shown in Fig. 1. The fabric shown in Figs. 1 and 2 consists of plates 10 which are flat, united by links 12 whose upper exposed portions are likewise flat. However, it is readily possible if desired to give a different surface contour to the links and plates, for example by embossing them, so that as shown in Fig. 9, the plates $10^x$ and $10^y$ are upwardly convex and likewise the exposed portion $12^z$ of the connecting link is convex.

While the plates have herein been shown as substantially square in outline, it is obvious that they may be of other shapes, for example circular with projecting ears in which the holes 11 are formed, or of such other contour as may be desired, and furthermore that by embossing the plates and connecting links as above suggested, the surface appearance and contour of these parts may likewise be varied and embellished.

While one desirable method of procedure has hereinabove been described and illustrated, it is to be understood that the invention is broadly inclusive of any and all modifications falling within the scope of the appended claims.

I claim:

1. That method of making a flexible mesh fabric of the kind wherein independent plates of sheet material are flexibly joined by links of sheet material, said method comprising as steps forming from a length of sheet material embryo plates with coupling elements and with narrow integral bridges of the sheet material joining the embryo plates, forming from a second length of sheet material embryo links with coupling elements which are interengageable with the coupling element of the embryo plates formed in the first sheet and with narrow integral bridges connecting the embryo links, assembling the connected plates with the connected links so that a connecting link is situated between each pair of plates, flexibly joining each pair of adjacent plates to the link between them by interengaging the coupling element of the plates and links and thereafter separating the plates from each other and the links from each other by removing the integral bridges between the plates and the links, leaving the plates and links united only by the interengaged coupling elements therebetween.

2. That method of making a flexible mesh fabric of the kind wherein independent plates of sheet material are flexibly joined by independent links of sheet material, said method comprising as steps providing a unit of sheet material consisting of a plurality of embryo plates with narrow integral bridges of the sheet material joining adjacent plates, each embryo plate having a plurality of holes therethrough, providing a unit of sheet material consisting of a plurality of embryo links with narrow bridges of the sheet material joining adjacent links, each embryo link having a plurality of integral unitary tabs, the tabs being of less width than the diameters of the holes in the plates, the tabs being disposed to extend substantially perpendicular to the plane of the sheet material, so assembling the last-named unit with the first unit that the tabs of a given link pass through openings in two adjacent plates, bending the free ends of each tab so that it cannot be withdrawn from the openings in the plate, removing the narrow bridges which unite the embryo plates thereby separating the plates, and removing the narrow bridges which unite the links, thereby separating the links and leaving the plates united only by the links.

References Cited in the file of this patent

UNITED STATES PATENTS

| | | |
|---|---|---|
| 812,605 | Slama | Feb. 13, 1906 |
| 1,450,961 | Otterbein | Apr. 10, 1923 |
| 2,158,929 | Dunajeff | May 16, 1939 |
| 2,192,573 | Dunajeff | Mar. 5, 1940 |
| 2,440,254 | Dodson | Apr. 27, 1948 |
| 2,663,072 | Pfistershammer | Dec. 22, 1953 |

FOREIGN PATENTS

| | | |
|---|---|---|
| 850,292 | France | Sept. 4, 1939 |